United States Patent [19]

Booher

[11] Patent Number: 4,626,022
[45] Date of Patent: * Dec. 2, 1986

[54] FLAT BED TRAILER WITH LIGHT REFLECTING STRUCTURE

[76] Inventor: Howard Booher, P.O. Box 277, Randolph, Ohio 44265

[*] Notice: The portion of the term of this patent subsequent to Jan. 14, 2003 has been disclaimed.

[21] Appl. No.: 652,515

[22] Filed: Sep. 20, 1984

[51] Int. Cl.[4] ............................................. B62D 33/04
[52] U.S. Cl. ...................................... 296/182; 296/204
[58] Field of Search ....................... 296/182, 181, 204; 105/422, 413, 347

[56] References Cited

U.S. PATENT DOCUMENTS

| | | | |
|---|---|---|---|
| 3,705,732 | 12/1972 | Marinelli | 296/182 |
| 4,357,047 | 11/1982 | Katz | 296/181 |
| 4,453,761 | 6/1984 | Felburn | 296/43 |

FOREIGN PATENT DOCUMENTS 1808588  8/1970  Fed. Rep. of Germany ...... 293/117

Primary Examiner—Robert R. Song
Attorney, Agent, or Firm—Harpman & Harpman

[57] ABSTRACT

A flat bed trailer formed of a pair of horizontally spaced longitudinally extending I-beams and a plurality of longitudinally spaced transversely extending members engaged in the I-beams adjacent their upper portions supports a floor formed of aluminum extrusions with longitudinally extending edge portions having recessed longitudinally extending channels in which light reflecting tape such as SCOTCH LITE, manufactured by the 3M Company of Minneapolis, Minn., is permanently positioned. A rear edge member extends across the back end of the flat bed trailer and carries a rear cap longitudinally thereof, both the rear edge and rear cap members having channels therein and continuous sections of light reflecting tape or the like disposed therein. Similar channels in the longitudinal edges of the lower portions of the I-beams are provided with light reflecting tape so that the sides and rear portions of the flat bed trailer are brilliantly illuminated by reflected light clearly outlining the peripheral edges of the flat bed trailer.

4 Claims, 3 Drawing Figures

FLAT BED TRAILER WITH LIGHT REFLECTING STRUCTURE

BACKGROUND OF THE INVENTION

1. Technical Field

This invention relates to flat bed trailer structures of the type normally employed to transport large heavy articles and palletized groups of smaller heavy articles and coils of flat rolled steel and the like.

2. Description of the Prior Art

Prior flat bed trailer structures of this type usually employ longitudinally extending horizontally spaced main frame members and a plurality of sub-frame members positioned transversely thereof and secured to the uppermost surfaces of the main frame members so as to support a suitable deck. A flat bed trailer representing the present state of the art is disclosed in my co-pending application for U.S. Ser. No. 591,928 on Flat Bed Trailer Structure filed Mar. 21, 1984 now U.S. Pat. No. 4,564,233, issued on Jan. 14, 1986.

The invention set forth in the above-mentioned pending patent application eliminates the usual cross frame members carried on the longitudinal frame members and the problems associated with maintaining the cross frame members in fixed position thereon.

The present disclosure relates to a novel improvement in edge lighting the peripheral edges of the trailer and the longitudinally extending main beams by forming channels in appropriate sections thereof and positioning light reflecting material in the channels where it will reflect light directed thereagainst as from the head lights of other vehicles or other light sources thus clearly and unmistakably indicating the peripheral edges of the flat bed trailer and providing a sigificant improvement in safety in that the drivers and operators of other vehicles may very readily determine just where the flat bed trailer of the present invention is located and without depending on the frequently malfunctioning clearance lights that have been used on some trailers in the past.

SUMMARY OF THE INVENTION

A flat bed trailer structure formed of extruded and/or fabricated aluminum shapes including I-beams and frame members of generally rectangular cross section are assembled by providing desirably shaped apertures in the web portions of the I-beams and positioning the frame members therein and applying extruded aluminum floor sections, edge rails on the sides and ends of the trailer and tie rails along the sides thereof and providing longitudinally extending channels in portions of the I-beams and in the edge rails and tie rails and positioning light reflecting material in said channels for edge lighting the flat bed trailer by reflected light. A suitable reflecting material comprises EDGE LITE reflective tape manufactured by 3M Company of Minneapolis, Minn. The I-beams, flooring edge sections and tie rails are preferably aluminum extrusions having channels longitudinally therein arranged to protect the light reflecting material disposed in the channels and spaced inwardly with respect to the adjacent surfaces of the metal sections so as to protect the same.

DESCRIPTION OF THE PREFERRED EMBODIMENT

Figure 1:
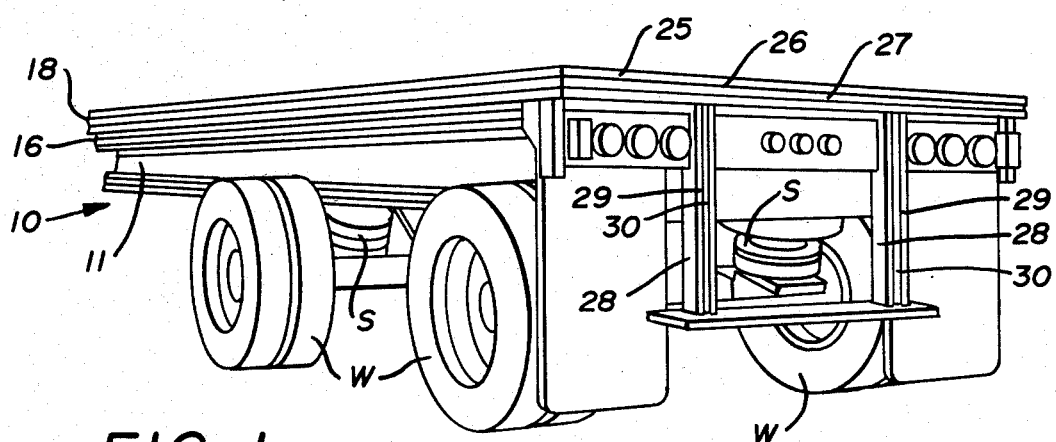
FIG. 1 is a perspective view of the rear portion of a flat bed trailer incorporating the light reflecting structure.

By referring to the drawings and FIG. 1 in particular, it will be seen that a portion of a flat bed trailer structure is disclosed which is preferably formed of aluminum extruded and fabricated sections and which has longitudinally extending I-beams 10, each of which has a vertically standing web portion 11, a T-shaped upper end 12 and an inverted T-shaped lower end 13. Notches are formed in longitudinally spaced relation in the webs 11 of the longitudinally extending I-beams 10 and a plurality of cross frame members 14 are positioned therein and welded thereto as best seen in FIG. 3 of the drawings.

The T-shaped upper end portions 12 of the I-beams 10 form parts of the flooring and similarly shaped aluminum extrusions are positioned between the T-shaped upper end portions 12 of the I-beams 10 to complete the flooring transversely of the flat bed trailer.

The edge portions of the flooring are formed of cross sectionally L-shaped aluminum extrusions 15, the vertical portions 16 of which form the edge rails or sides of the flat bed trailer. Cross sectionally U-shaped brackets 17 are affixed to the vertical portions 16 in spaced relation and a tie rail 18 is attached thereto so as to extend continuously along the vertical portions 16 of the extrusions which define the edge portions of the flat bed trailer.

Figure 3:
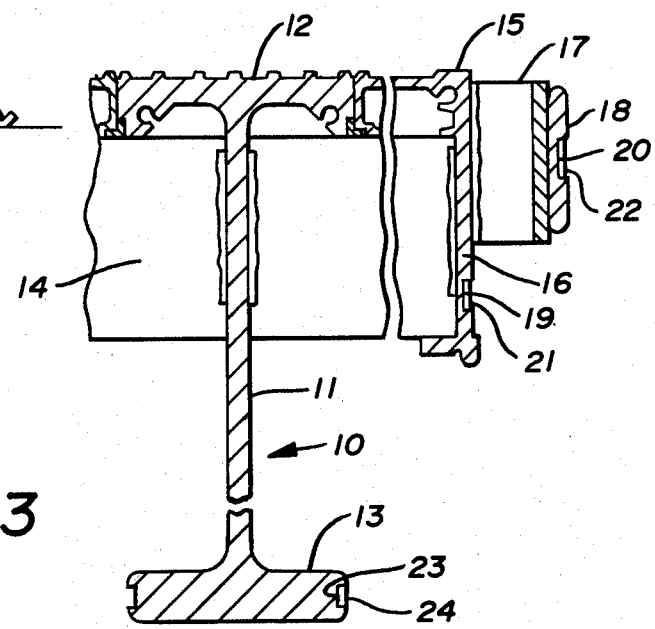
FIG. 3 is an enlarged vertical section on line 3—3 of FIG. 2.

By referring to FIG. 1 of the drawings, it will be seen that these vertical portions 16 of the L-shaped aluminum extrusions 15 and the tie rails 18 have longitudinally extending concave channels 19 and 20 respectively formed therein and that as best seen in FIG. 3 of the drawings, light reflective material 21 and 21 such as SCOTCH LITE reflective tape, as manufactured by 3M Company of Minneapolis, Minn. is permanently positioned in the concave channels 19 and 20 respectively where its light reflecting surface formed of a plurality of very small glass spheres is suitably protected from damage by the adjacent portions of the vertical portions 16 forming the edge rails and the vertical portions of the tie rail 18.

Those skilled in the art will observe that the SCOTCH LITE refelctive tape is available in a number of different colors and it has been found that the electric blue color creates a very visable and highly noticeable and attractive edge lighting of the peripheral edges of the flat bed trailer.

Still referring to FIG. 3 of the drawings, it will be seen that one longitudinal edge of the inverted T-shaped lower end 13 of each of the I-beams 10 of the trailer has a longitudinally extending flat wide groove 23 formed therein in which a continuous section of light reflecting material 24, such as the SCOTCH LITE tape hereinbefore referred to, is permanently postioned.

Figure 2:
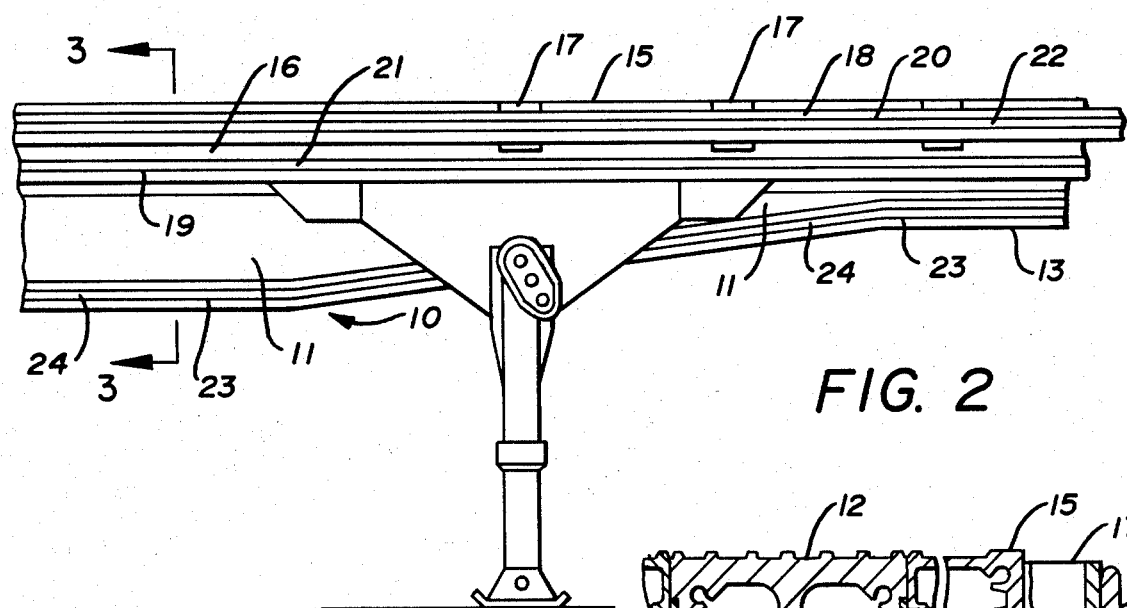
FIG. 2 is an enlarged side elevation of a portion of a flat bed trailer intermediate its ends and illustrating portions of the longitudinally extending main beam, the edge rails and tie rails and the light reflecting structure thereof.

By referring now to FIG. 2 of the drawings, a portion intermediate the ends of a flat bed trailer formed in accordance with the invention may be seen in which the light reflecting material 24 in the channel 23 in the I-beam 10 is clearly disclosed as extending along the lower end or edge of the I-beam 10 in the portions thereof where it is of maximum height and the portions toward the front of the trailer where it is of reduced height to accommocate the usual fifth wheel which is found in trailers and necessary for towing the same on a tractor, towing vehicle or the like.

By referring to FIG. 1 of the drawings, it will be seen that in addition to the edge lighting of the lower ends or flanges of the main longitudinally extending beams 10 and the edge portions and tie rails on the sides of the trailer, the rearmost portion of the trailer is defined by a rear cap 25 in which a channel 26 extends continually and in which channel 26 a continuous section of light reflective material 27 is positioned. The channel 26 is, like the other channels hereinbefore mentioned, relatively wide and flat and is preferably at least 0.030 inches deep so as to protect the light reflecting material positioned therein. Still referring to FIG. 1 of the drawings, it will be seen that vertically disposed rear bumper portions 28 extend downwardly from the rear of the flat bed trailer such as defined by one of the cross beams 14 and are provided with channels 29 in which light reflecting material 30 is positioned.

The portion of the flat bed trailer illustrated in FIG. 1 clearly points out the novel arrangement of the edge lighting provided by the present invention with respect to the peripheral edge of the flat bed trailer, the vertical bumper portions on the rear thereof and the lower continuous edges of the main longitudinal extending frame members. The portion of the trailer illustrated in FIG. 1 has the usual ground engaging wheel assemblies and the air suspension assemblies S as known in the art.

It will thus be seen that an unusual safety factor is introduced into a flat bed trailer structure or the like by forming some of the structural members thereof with wide flat grooves or channels therein and positioning light reflective material in protective relation in the channels. As disclosed herein, the channels on the tie rails and edge portions of the flat bed trailer merge in a continuous line with the comparable portions extending across the ends of the trailer so that the edge lighting covers the entire periphery of the trailer bed.

The wide flat channels or grooves disclosed herein are shown herein with flat surfaces and it will occur to those skilled in the art that if desired they can be convex or concave or both so that their ability to reflect light is improved with respect to various light sources and the positions above or below the light reflecting material in which the light sources are located.

It will thus be seen that a flat bed trailer with light reflecting structures has been disclosed which incorporates novel structural members extruded and/or fabricated, preferably welded in an assembly that produces an exceedingly strong distortion resistant flat bed trailer of relatively light weight and most importantly incorporates means for conveniently, inexpensively and permanently mounting light reflective material such as the SCOTCH LITE light reflecting tape hereinbefore referred to which provides an unusual visibility factor contributing to the overall visibility of the flat bed trailer.

The invention disclosed herein may be incorporated in other trailer constructions, such as those having enclosed bodies formed by side and end walls and tops by adding structural members or trim members having wide preferably flat grooves therein in which light reflecting material is positioned so as to outline the trailer bodies in one or more locations.

Having thus described my invention, what I claim is:

1. In a flat bed trailer structure consisting of a pair of horizontally spaced longitudinally extending, integral I-beams, each having vertically spaced upper and lower horizontally disposed portions and an intermediate vertically disposed web portion, a plurality of longitudinally spaced, transversely positioned cross frame members having spaced vertically disposed side walls positioned in transversely registering apertures in said web portion of said I-beams contiguous with said upper horizontally disposed portions of said I-beams, each of said registering apertures defined by spaced vertically positioned sides, longitudinally extending floor sections positioned on the transversely positioned cross frame members in side by side relatin with one another and with said upper horizontally disposed portions of said I-beams, edge rails positioned on the opposite ends of said transversely positioned cross frame members and mounted thereon, and tie rails mounted on said edge rails, said spaced vertically disposed side walls of said cross frame members welded to said web portions of said I-beams on opposite sides of said apertures therein to form spaced double welds between said cross frame members and said I-beams, said floor sections and the edge rails affixed to said cross frame members, and a rear cap extending across the rear of said flat bed trailer, the improvement in combination therewith comprising wide flat groove means in portions of said I-beams and in portions of said tie rails and in portions of said rear cap, and light reflecting material positioned in said groove means so as to edge light said flat bed trailer when light from a light source is directed thereagainst.

2. The improvement in a flat bed trailer structure set forth in claim 1 and wherein vertically disposed bumpers are attached to said flat bed trailer at one end thereof and extend downwardly therefrom and wherein shallow wide concave grooves are formed in said vertically positioned bumpers and light reflecting material is positioned in said shallow wide grooves.

3. The flat bed trailer set forth in claim 1 and wherein said grooves means in said beams and edge rails are slightly concave.

4. The improvement in a flat bed trailer structure set forth in claim 1 and wherein cross sectionally U-shaped brackets are affixed to said edge rails in longitudinally spaced relation to one another and wherein said tie rails are affixed to said brackets in continuously spaced relation to said edge rails and wherein said groove means includes continuously extending longitudinal channels of a known depth formed in said tie rails and channels in said edge rails and wherein the light reflecting material positioned in said longitudinal channels of said tie rails has a thickness less than the known depth of said channels in said tie rails, said brackets defining stake pockets, said channels and said light reflecting material in said channels in said tie rails being spaced vertically in relation to said channels and the light reflecting material therein in said edge rails whereby double light reflecting surfaces are formed along portions of said flat bed trailer.

* * * * *